United States Patent
Lemay et al.

(10) Patent No.: US 10,324,863 B2
(45) Date of Patent: Jun. 18, 2019

(54) PROTECTED MEMORY VIEW FOR NESTED PAGE TABLE ACCESS BY VIRTUAL MACHINE GUESTS

(71) Applicant: Intel Corporation, Santa Clara, CA (US)

(72) Inventors: Michael Lemay, Hillsboro, OR (US); David M. Durham, Beaverton, OR (US); Ravi L. Sahita, Portland, OR (US); Andrew V. Anderson, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 14/127,561

(22) PCT Filed: Jun. 24, 2013

(86) PCT No.: PCT/US2013/047381
§ 371 (c)(1),
(2) Date: Dec. 19, 2013

(87) PCT Pub. No.: WO2014/209269
PCT Pub. Date: Dec. 31, 2014

(65) Prior Publication Data
US 2014/0380009 A1    Dec. 25, 2014

(51) Int. Cl.
*G06F 12/00* (2006.01)
*G06F 12/14* (2006.01)
(Continued)

(52) U.S. Cl.
CPC ........ *G06F 12/145* (2013.01); *G06F 9/30076* (2013.01); *G06F 9/45558* (2013.01);
(Continued)

(58) Field of Classification Search
None
See application file for complete search history.

(56) References Cited

U.S. PATENT DOCUMENTS 7,130,977 B1 * 10/2006 Christie .............. G06F 12/1009
  711/163
8,364,932 B2    1/2013 Ali et al.
(Continued)

FOREIGN PATENT DOCUMENTS

WO    2011011769    1/2011

OTHER PUBLICATIONS

Wu, et al, "Taming Hosted Hypervisors with (Mostly) Deprivileged Execution", Department of Computer Science, North Caroline State University; Department of Computer Science, Florida State University, Feb. 2013.
(Continued)

*Primary Examiner* — Reginald G Bragdon
*Assistant Examiner* — Michael L Westbrook
(74) *Attorney, Agent, or Firm* — Grossman, Tucker, Perreault & Pfleger, PLLC

(57) ABSTRACT

Generally, this disclosure provides systems, methods and computer readable media for a protected memory view in a virtual machine (VM) environment enabling nested page table access by trusted guest software outside of VMX root mode. The system may include an editor module configured to provide access to a nested page table structure, by operating system (OS) kernel components and by user space applications within a guest of the VM, wherein the nested page table structure is associated with one of the protected memory views. The system may also include a page handling processor configured to secure that access by maintaining security information in the nested page table structure.

26 Claims, 10 Drawing Sheets

(51) Int. Cl.
  *G06F 12/1009* (2016.01)
  *G06F 9/455* (2018.01)
  *G06F 21/70* (2013.01)
  *G06F 21/79* (2013.01)
  *G06F 9/30* (2018.01)

(52) U.S. Cl.
  CPC ...... *G06F 12/1009* (2013.01); *G06F 12/1491* (2013.01); *G06F 21/70* (2013.01); *G06F 21/79* (2013.01); *G06F 2009/45583* (2013.01); *G06F 2212/1052* (2013.01); *G06F 2212/151* (2013.01)

(56) References Cited

U.S. PATENT DOCUMENTS

| | | | |
|---|---|---|---|
| 8,635,705 | B2 | 1/2014 | Sahita et al. |
| 2006/0206687 | A1* | 9/2006 | Vega .................. G06F 12/10 711/206 |
| 2010/0318762 | A1* | 12/2010 | Malyugin ........... G06F 12/1027 711/207 |
| 2011/0087822 | A1 | 4/2011 | Bennett et al. |
| 2011/0107008 | A1 | 5/2011 | Ben-Yehuda et al. |
| 2012/0079479 | A1* | 3/2012 | Hakewill ............ G06F 9/45558 718/1 |
| 2012/0191948 | A1 | 7/2012 | Day, II et al. |
| 2013/0117743 | A1 | 5/2013 | Neiger et al. |
| 2014/0173600 | A1* | 6/2014 | Ramakrishnan Nair .................... G06F 9/461 718/1 |
| 2014/0372719 | A1* | 12/2014 | Lange ................. G06F 21/554 711/163 |

OTHER PUBLICATIONS

Wartell, et al., "Binary Stirring: Self-randomizing Instruction Addresses of Legacy x86 Binary Code", Department of Computer Science, The University of Texas at Dallas, Oct. 16-18, 2012.
Bovet, et al., "Understanding the Linux Kernal", 3rd Edition, 2006.
International Search Report and Written Opinion from related application PCT/2013/047381 dated Mar. 25, 2014.
International Preliminary Report on Patentibility from related application PCT/2013/047381 dated Jan. 7, 2016.
Intel 64 and IA-32 Architectures Software Developer's Manual, vol. 3 (3A, 3B & 3C), System Programming Guide, Mar. 2013, part 1 of 13.
Intel 64 and IA-32 Architectures Software Developer's Manual, vol. 3 (3A, 3B & 3C), System Programming Guide, Mar. 2013, part 2 of 13.
Intel 64 and IA-32 Architectures Software Developer's Manual, vol. 3 (3A, 3B & 3C), System Programming Guide, Mar. 2013, part 3 of 13.
Intel 64 and IA-32 Architectures Software Developer's Manual, vol. 3 (3A, 3B & 3C), System Programming Guide, Mar. 2013, part 4 of 13.
Intel 64 and IA-32 Architectures Software Developer's Manual, vol. 3 (3A, 3B & 3C), System Programming Guide, Mar. 2013, part 5 of 13.
Intel 64 and IA-32 Architectures Software Developer's Manual, vol. 3 (3A, 3B & 3C), System Programming Guide, Mar. 2013, part 6 of 13.
Intel 64 and IA-32 Architectures Software Developer's Manual, vol. 3 (3A, 3B & 3C), System Programming Guide, Mar. 2013, part 7 of 13.
Intel 64 and IA-32 Architectures Software Developer's Manual, vol. 3 (3A, 3B & 3C), System Programming Guide, Mar. 2013, part 8 of 13.
Intel 64 and IA-32 Architectures Software Developer's Manual, vol. 3 (3A, 3B & 3C), System Programming Guide, Mar. 2013, part 9 of 13.
Intel 64 and IA-32 Architectures Software Developer's Manual, vol. 3 (3A, 3B & 3C), System Programming Guide, Mar. 2013, part 10 of 13.
Intel 64 and IA-32 Architectures Software Developer's Manual, vol. 3 (3A, 3B & 3C), System Programming Guide, Mar. 2013, part 11 of 13.
Intel 64 and IA-32 Architectures Software Developer's Manual, vol. 3 (3A, 3B & 3C), System Programming Guide, Mar. 2013, part 12 of 13.
Intel 64 and IA-32 Architectures Software Developer's Manual, vol. 3 (3A, 3B & 3C), System Programming Guide, Mar. 2013, part 13 of 13.

* cited by examiner

PROTECTED MEMORY VIEW FOR NESTED PAGE TABLE ACCESS BY VIRTUAL MACHINE GUESTS

FIELD

The present disclosure relates to a protected memory view for nested page table access by virtual machine guests, and more particularly, to a protected memory view for extended page table (EPT) access by trusted guest software executing outside of virtual-machine extensions (VMX) root mode.

BACKGROUND

Operating systems typically employ monolithic kernels that grant full memory access to all kernel code. Thus, defective or malicious kernel code may compromise the operation of unrelated portions of the kernel. Kernels that are initially considered secure or non-malicious may still be vulnerable to attacks that inject new, malicious code into the kernel, or cause existing code to operate in a malicious manner (e.g. return-oriented programming attacks). Additionally, application spaces within an OS are generally shared under one paging hierarchy creating another monolithic memory space, where all libraries and data structures in the same process have the same access rights, and where further partitioning is limited to process boundaries.

Some types of anti-malware systems use virtual machine environments to partition OS kernel components and other applications to selectively prevent certain segments of code from accessing particular data structures. This may be accomplished by providing separate memory views, for each trusted software component, that has exclusive write access to its own data structures, thus preventing other kernel code from accessing those structures and possibly disrupting the functionality of the trusted software. A hypervisor or virtual machine monitor (VMM) may provide management of these views.

As the memory views become larger and more dynamic, however, the overhead associated with maintaining permissions and detecting and restricting access may become prohibitively expensive as view modification become more frequent. Additionally, the performance limitations of these existing approaches may prevent their application to many potentially useful types of malware monitoring.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, methods and computer readable media for a protected memory view enabling nested page table access by trusted guest software executing outside of virtual-machine extensions (VMX) root mode. The nested page tables may, for example, be extended page tables (EPTs). The protected memory view may improve the performance of virtualization-based anti-malware systems by selectively preventing regions of code from accessing particular data structures, without requiring relatively expensive transitions into and out of VMX root mode. The protected view may be configured as an EPT editor providing the capabilities to modify existing views and define new views. The EPT editor may be invoked by guest software using a Syscall style interface that uses a Virtual Memory Function (VMFUNC) instruction to switch between views.

Figure 1:
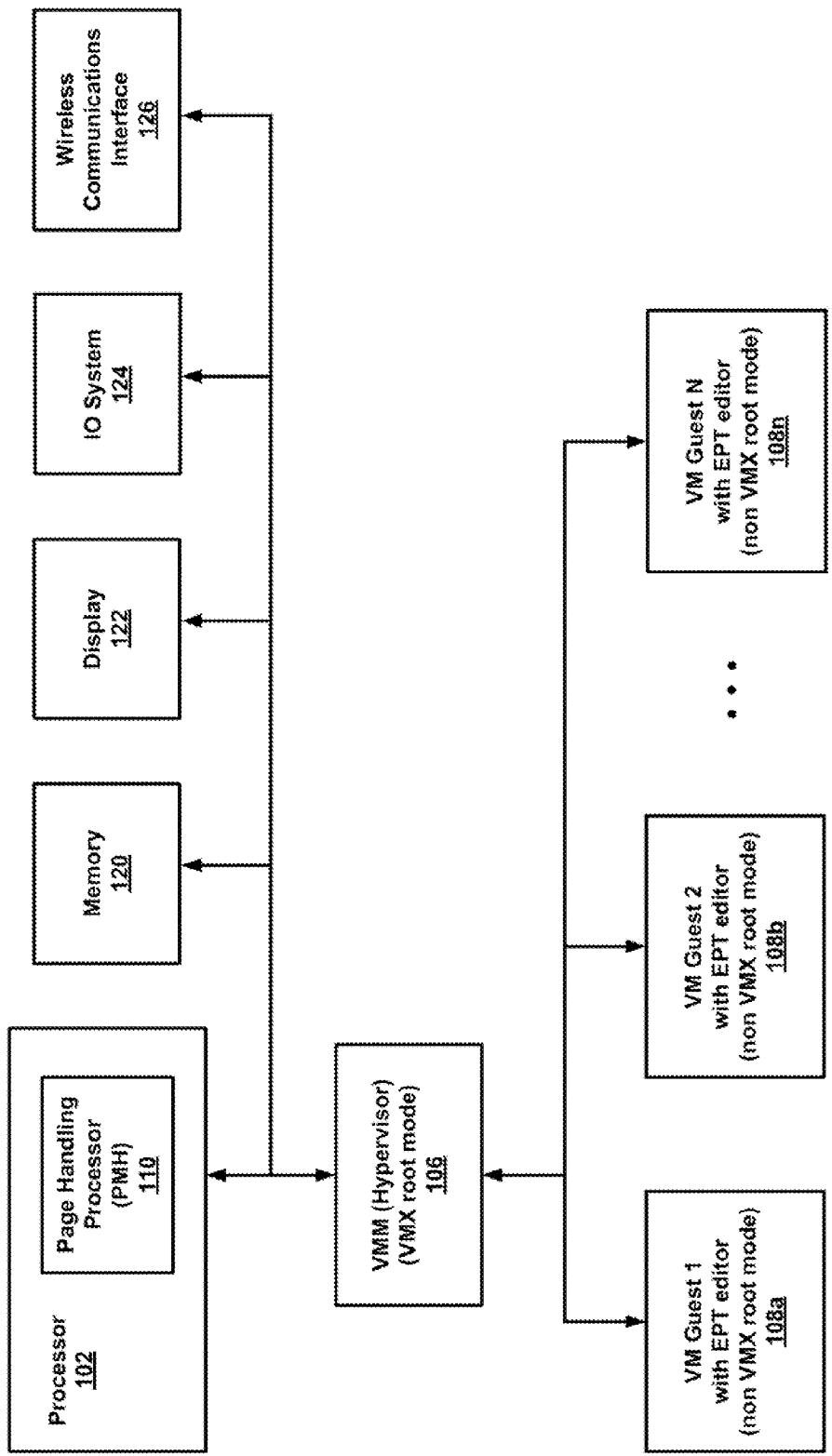
FIG. 1 illustrates a top level system diagram of one example embodiment consistent with the present disclosure.

FIG. 1 illustrates a top level system diagram 100 of one example embodiment consistent with the present disclosure. The system 100 may be a hardware platform or computing device such as, for example, a smart phone, smart tablet, personal digital assistant (PDA), mobile Internet device (MID), convertible tablet, notebook or laptop computer, desktop computer, server, smart television or any other device whether fixed or mobile. The device may generally present various interfaces to a user via a display 122 such as, for example, a touch screen, liquid crystal display (LCD) or any other suitable display type.

The system 100 is shown to include a processor 102. In some embodiments, processor 102 may be implemented as any number of processor cores. The processor (or processor cores) may be any type of processor, such as, for example, a micro-processor, an embedded processor, a digital signal processor (DSP), a network processor, a field programmable gate array or other device configured to execute code. Processor 102 may be a single-threaded core or, a multi-threaded core in that it may include more than one hardware thread context (or "logical processor") per core. System 100 is also shown to include a memory 120 coupled to the processor 120. The memory 120 may be any of a wide variety of memories (including various layers of memory hierarchy and/or memory caches) as are known or otherwise available to those of skill in the art. System 100 is also shown to include an input/output (IO) system or controller 124 which may be configured to enable or manage data communication between processor 102 and other elements of system 100 or other elements (not shown) external to system 100. System 100 may also include wireless communication interface 126 configured to enable wireless communication between system 100 and any external entities. The wireless communications may conform to or otherwise be compatible with any existing or yet to be developed communication standards including mobile phone communication standards.

The processor 102 may be a host processor for a virtual machine (VM) environment and memory 120 may be configured as host physical memory to be protected from direct access by VM guests 108. Host processor 102 is shown to include a page handling processor 110 which may also be referred to as a Page Miss Handler (PMH). PMH 110 may be an additional processor or sub-processor of any type, as previously described, configured to interpret and walk through page table structures, as will be described in greater detail below.

It will be appreciated that in some embodiments, the various components of the system 100 may be combined in a system-on-a-chip (SoC) architecture. In some embodiments, the components may be hardware components, firmware components, software components or any suitable combination of hardware, firmware or software.

VMM module 106 (also referred to as a hypervisor) provides management and/or hosting of one or more VM guests 108a, 108b, . . . 108n. VMM 106 executes in VMX root mode which is the highest privileged mode associated with processor 102. VM guests 108 execute in modes of lower privilege (i.e., non VMX root mode) which may include, for example, ring 0 (or supervisor) mode and ring 3 (or user) mode. Ring 0 privilege mode is a reduced privilege mode relative to VMX root mode (i.e., the privilege mode associated with the VMM) and ring 3 privilege mode is yet a further reduced privilege mode relative to ring 0 mode.

Although VM guests may share the same host physical memory, the VMM protects the physical memory through EPT based mappings between guest physical memory addresses and host physical memory addresses. The EPTs provide a second layer of paging structures (below the conventional OS page table layer) that are controlled by the VMM as illustrated and described in greater detail in connection with FIG. 6 below. VM guests may be configured to provide an EPT editor view, as will also be described in greater detail below. The EPT editor enables secure access to and modification of selected EPTs (and thus access to memory views associated with those EPTs) to trusted guest software executing in ring 0 mode, for example guest OS kernel components, without requiring a transition to VMX root mode through relatively less efficient VM calls and VM exits. This may improve the performance of applications that require larger or more frequent EPT modifications.

Although various embodiments of the present disclosure are described in terms of EPTs, any suitable type of nested page table structure or other hierarchical page table scheme may be employed.

Figure 2:
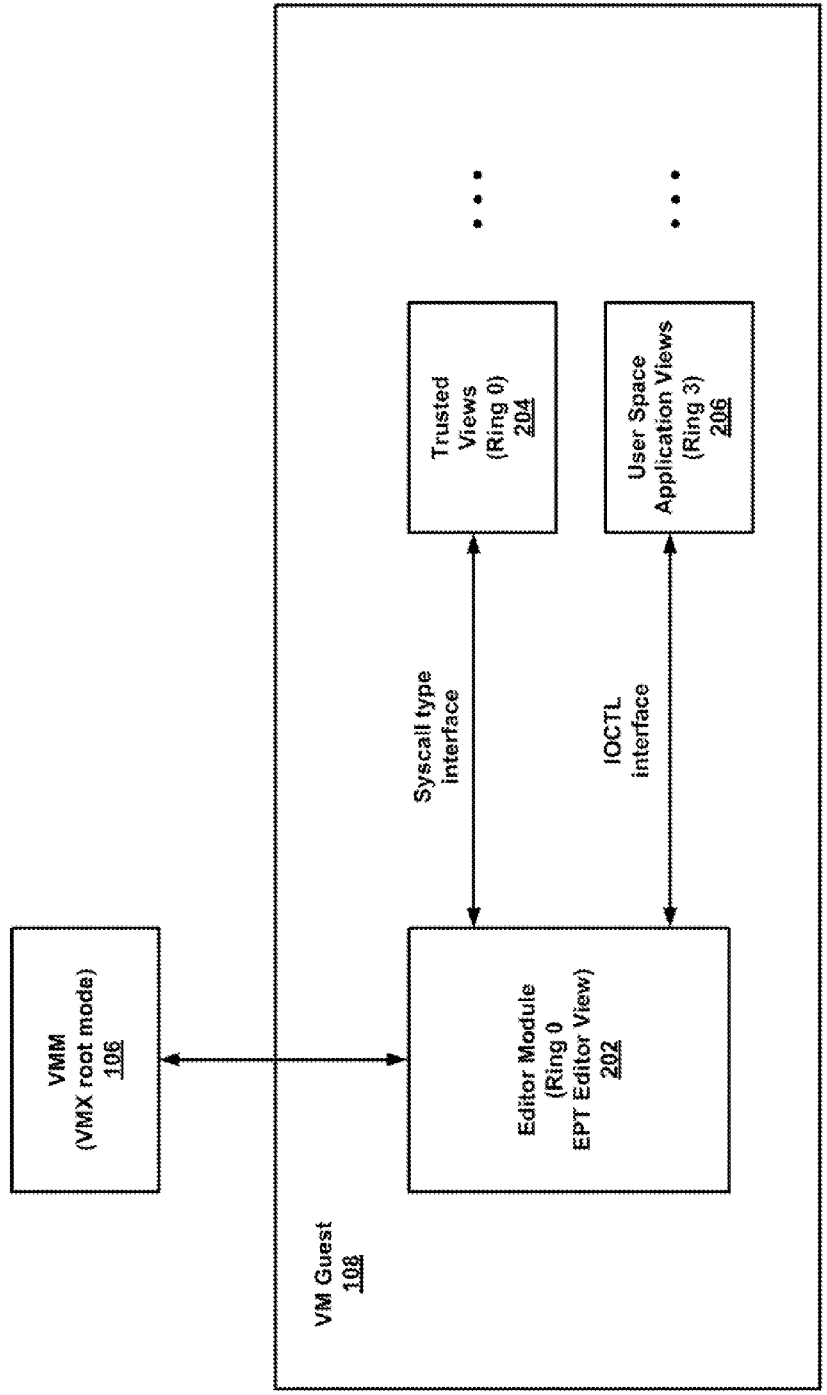
FIG. 2 illustrates a block diagram of one example embodiment consistent with the present disclosure.

FIG. 2 illustrates a block diagram 200 of one example embodiment consistent with the present disclosure. VM guest 108 is shown to include an editor module 202 which may be configured to edit nested page table structures, such as, for example EPTs. The editor module 202 may also be configured to run in ring 0 (or supervisor) mode. VM guest 108 may also include trusted views 204, also configured to run in ring 0, and user space application views 206 configured to run in ring 3 (or user) mode. The trusted views 204 may include, for example, guest OS kernel components. A Syscall style interface may be provided between the EPT editor view 202 and the trusted views 204, while an IOCTL interface may be provided between the EPT editor view 202 and the user space application views 206, as will be explained in greater detail below. These interfaces prevent trusted and untrusted software within the guest from modifying EPTs directly, which would raise security issues. Instead, the interfaces provide a path for guest software through the protected memory view of the EPT editor. The EPT editor may also be referred to as an inline EPT editor to indicate that it is part of the ring 0 kernel.

The performance improvements provided by the EPT editor may allow for the application of views to monitor and restrict access to sensitive data and regions of the computer system, such as, for example, memory mapped I/O (MMIO) regions (and the devices associated therewith), page tables and the Windows™ registry. The application of views to MMIO access may be used to protect sensor inputs and actuator outputs of the computer system, providing for more secure I/O. Improved anti-malware systems may be implemented based on these capabilities.

In some embodiments, the EPT editor view is created, during initialization, to protect the data structures needed for the operation of the EPT editor and to grant the editor access to the EPTs created by the VMX root mode software during initialization as well as access to the EPT pointer (EPTP) list. Additionally, other trusted views, which are allowed to invoke the EPT editor view, are also configured to permit invocation of the EPT editor view through the VMFUNC instruction set architecture (ISA).

The EPT editor communicates with the VMX root using system calls to the hypervisor (e.g., hypercalls) or other enumeration methods, such as for, example, the CPUID instruction, to obtain the guest physical address of the EPTP list. Using this, the editor can modify views created by the VMX root and create new views that may then be inserted into the list.

The EPT editor may be configured to populate a hash table with mappings from host physical addresses to guest virtual addresses for memory regions owned by the VMX root. Addresses within EPTs are host physical addresses, so the EPT editor needs to be able to map those addresses to guest virtual addresses in order to manipulate the EPTs. The EPT editor may also populate a hash table with similar mappings for new memory that it allocates to itself for storing EPTs.

When the EPT editor allocates a new region of memory, it uses its own EPT editing capabilities to prevent other guest software from accessing that memory. This permits it to dynamically allocate the amount of memory that is actually required for EPTs while providing appropriate protections for that memory.

An instruction to invalidate translations derived from an EPT (INVEPT) is available in the ISA to permit the VMX root to selectively invalidate views. However, use of INVEPT is only permitted in VMX root mode. Thus, one option for invalidating updated views is to maintain data indicating their status and causing VMX root to invalidate them using INVEPT when VMX root mode is entered for some other reason. This approach, however, would not prevent the use of stale mappings prior to the invocation of INVEPT.

Figure 3:
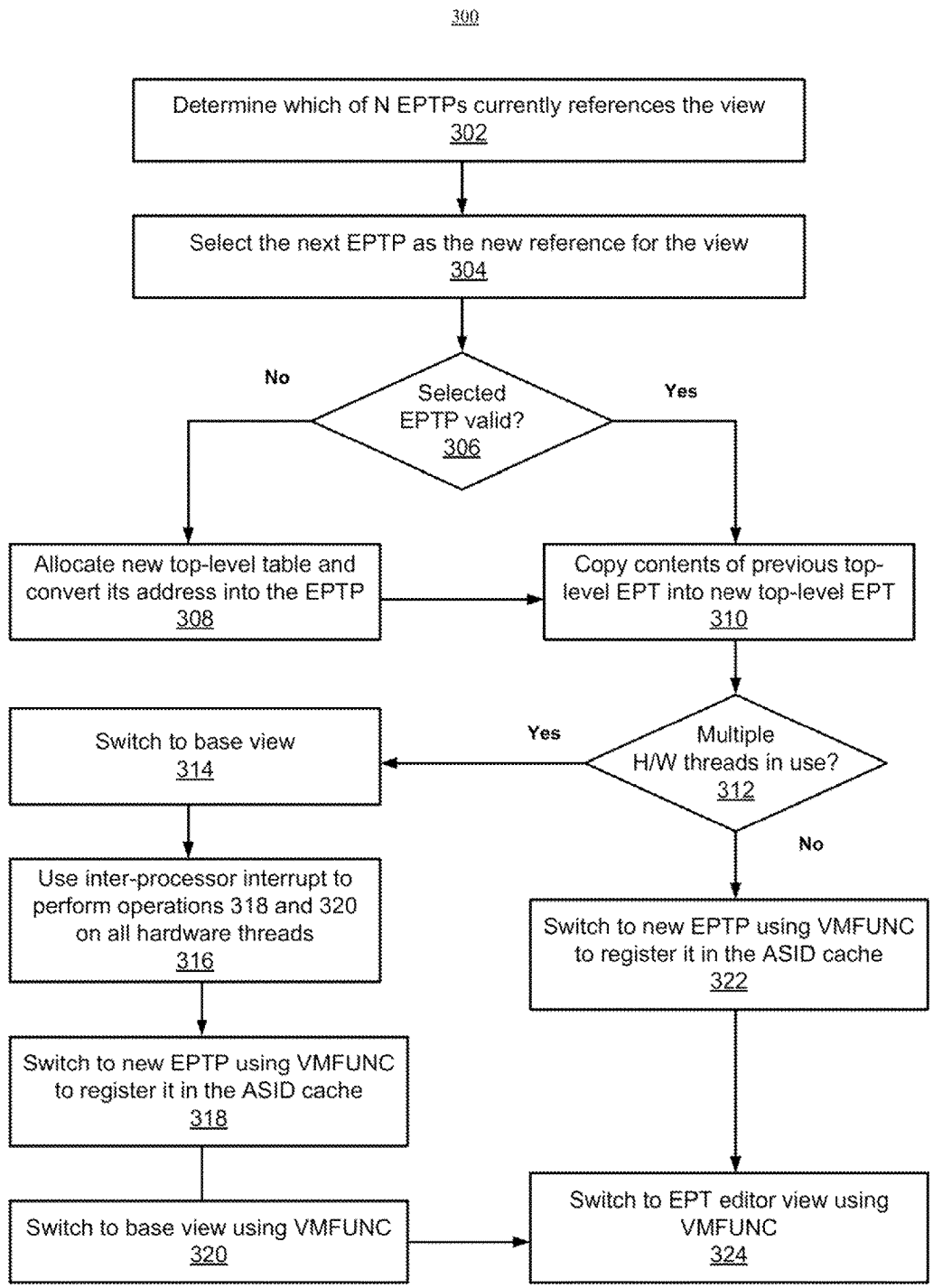
FIG. 3 illustrates a flowchart of operations of an example embodiment consistent with the present disclosure.

In some embodiments, other invalidation strategies are possible, some of which do not require the use of INVEPT (or reduce the use of INVEPT). They rely upon implementation details of the translation-related caches to ensure that stale data in those caches is not used. When EPTs are used, both cached combined mappings, from a guest linear address to a host physical address, and cached guest physical mappings, from a guest physical address to a host physical address, may be used. A VMFUNC generated view switch may invalidate all guest physical mappings for the affected guest. Combined mappings are tagged by an Address Space Identifier (ASID), which is a function of the current value of bits 51:12 of the EPTP (referred to as EP4TA), the Process-Context Identifier (PCID), and the Virtual Processor Identifier (VPID). For ordinary translation look-aside buffer (TLB) entries, all three of those items must match between the cache entry and the current state of the guest. For global TLB entries, the PCID is not tested. The ASID cache that may hold the outputs from that function is limited to N, a small number of entries, and is updated according to a least-recently-used policy, so that the oldest ASID is removed when it is necessary to add a new ASID to a full ASID cache. When an ASID is flushed from the cache, any entries that are in the translation-related caches, that could be retrieved using that ASID, are also flushed. This ensures that only freshly cached translation data is used, by performing the following operations, consistent with an embodiment as illustrated in FIG. 3.

At operation 302, a determination is made as to which of N EPTPs currently references the view. Up to M distinct EPTPs may be created on-demand for each logical view, where M is greater than or equal to N. Each EPTP refers to a level four, page map table (PML4) with content that is synchronized with that of the other PML4 tables for that logical view. That synchronization may be performed in a "lazy" fashion (e.g., when an opportunity is available, or when otherwise convenient) to improve efficiency, so that the tables may not be synchronized at all times, however a table about to be activated is updated to the correct content at that point in time. In some embodiments, the PML4 tables may be marked as write-protected so that any attempt to modify them generates a virtualization exception (#VE) or a VM exit, which can then cause the write to be propagated to all replicas. A virtualization exception (#VE) is a generally more efficient exception vector for EPT violations that is reported directly to the guest (and, therefore, also to the EPT editor).

At operation 304, the location in the EPTP list corresponding to the logical view number is updated with a selected next EPTP for that logical view when it is necessary to invalidate that logical view, in a round-robin fashion. If the selected EPTP is valid (operation 306) the contents of the previous top level EPT are copied into the new top level EPT (operation 310) otherwise, a new top-level table is allocated and its address is converted into the EPTP (operation 308)

At operation 322, the VMFUNC instruction is used to switch out of the EPT editor and into the affected view. This will ensure that the ASID cache is updated with the new ASID. At operation 324, a switch back to the EPT editor view is performed. This ensures that at least N other distinct EP4TA values are used to generate ASIDs between consecutive activations of any particular EPTP, hence the ASID cache will have flushed the ASID associated with that EPTP at some point between any two usages of that EPTP. This operation is performed in all hardware threads (e.g., processor cores) at operations 318-324, using an inter-processor interrupt to initiate it in other hardware threads. Some embodiments may employ processors that support a hyperthreading feature (e.g., multiplexing multiple threads onto a single processing core).

In some embodiments, an optimization may include using a VM call to execute an INVEPT instruction when the round robin algorithm returns to the first PML4 table replica. This may eliminate the need for the previous operation and thus improve performance by reducing the number of VMFUNC invocations. It may also permit the use of fewer than N PML4 table replicas, although that would increase the number of VM calls.

In some embodiments, a further optimization may include allocating a separate EPTP list for each hardware thread. This permits the EPT editor to rotate only through EPTPs for each view on-demand. When a view is marked as invalid, the EPT editor checks whether any hardware threads are using that view. If the current thread is using it, the EPT editor performs an efficient local invalidation. If other threads are using it, the EPT editor performs an invalidation for all threads, as described previously. Otherwise, the EPT editor marks the view as invalid on a per-thread basis. When each thread subsequently attempts to enter that view, it performs a local invalidation.

In some embodiments, a further optimization may include choosing to not invalidate a view for certain hardware threads when the edits affecting the view only weaken its access controls, such as updating a formerly read-only page to be readable and writable. Another example would be updating a formerly non-executable page to be executable. This may result in spurious EPT violations in those hardware threads if and when they attempt to perform the newly allowed operation, but handling those violations may be more efficient than preemptively invalidating the view. This is particularly true if virtualization exception #VE is enabled.

In some embodiments, a further optimization may include changing the mapping from guest physical address to host physical address when EPT edits strengthen access controls. For example, this scenario can arise when a guest pages part of a process into a page on a particular hardware thread and that page must be protected from accesses by other software. The EPT editor could detect this event and create a new mapping for that page on the affected hardware thread into a reserved pool of memory. Other hardware threads would not be able to access that memory until they started using the new mapping with the proper access controls, although they could still use the affected guest physical address to access the previously mapped memory.

In some embodiments, the invalidate process context identifier (INVPCID) instruction may be used, on processors that support it, to invalidate linear and combined mappings for one or more process context identifiers (PCIDs) used within the guest for the current virtual processor ID (VPID). For example, a type-2 INVPCID invalidates all linear and combined mappings for all PCIDs. This could be paired with a VMFUNC instruction invocation to also invalidate all guest-physical mappings for the guest.

The EPT editor may be configured to track the dynamic memory allocations that are performed by the editor. A straightforward approach would be to first allocate a desired block of memory, and then allocate more memory to hold a memory descriptor referring to the former block. However, since that descriptor must be protected from other guest software and such protections operate at a page granularity, it would be necessary to either allocate a whole page of memory for that single descriptor or combine multiple descriptors on a single page. The former approach wastes memory, and the latter approach introduces additional memory management challenges. One solution to this problem is to allocate a contiguous block of memory that holds all descriptors in a large list and dynamically create a new, larger block when the old block is overfull and copy all of the descriptors from the old block to the new block. Another solution is to allocate a two-level structure comprising a list of lists. This eliminates copying of the child lists when the structure becomes overfull, so that it is possible to expand the parent list using the preceding operation.

Figure 4A:
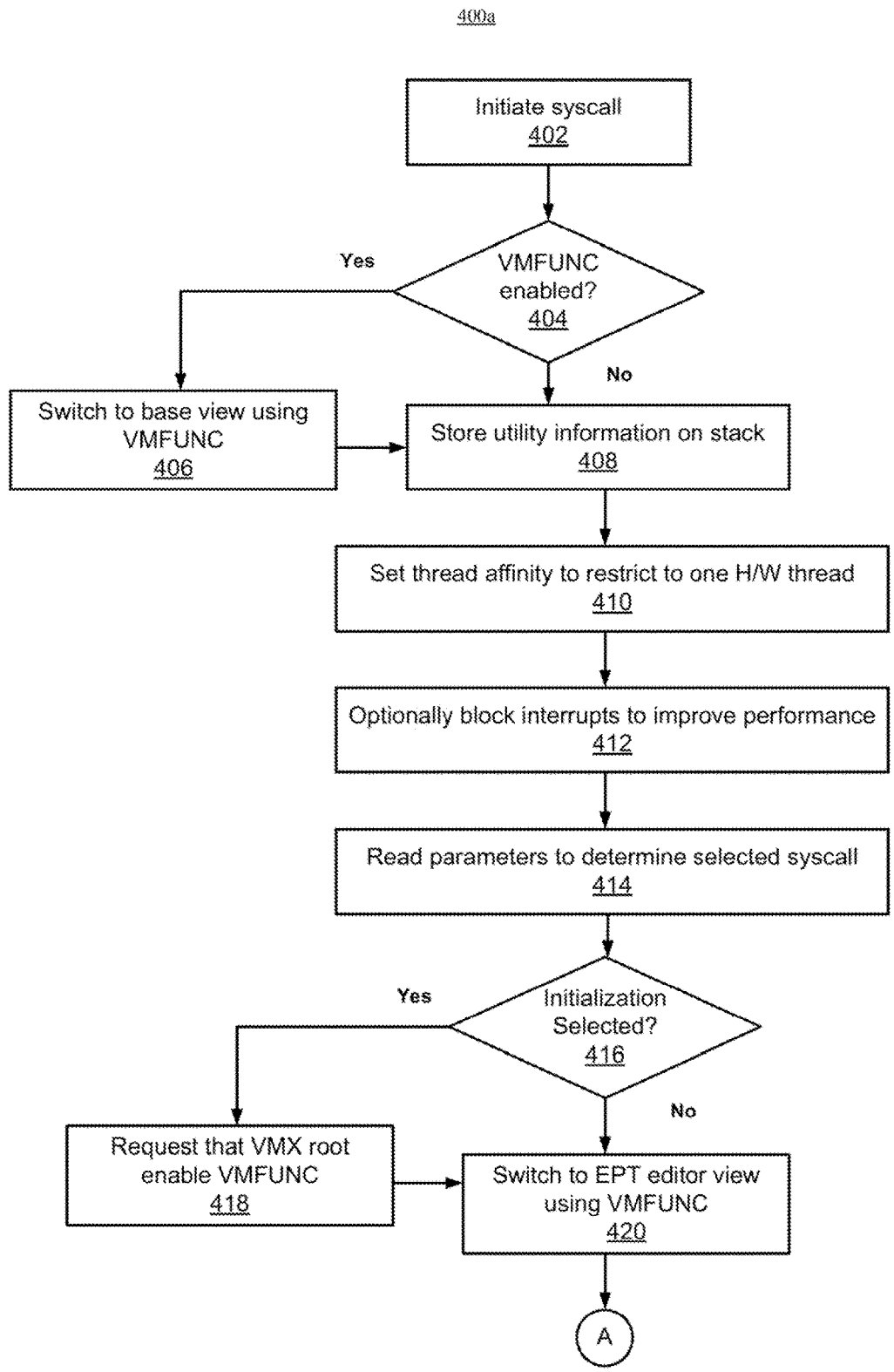
FIG. 4 illustrates a flowchart of operations of another example embodiment consistent with the present disclosure.
Figure 4B:
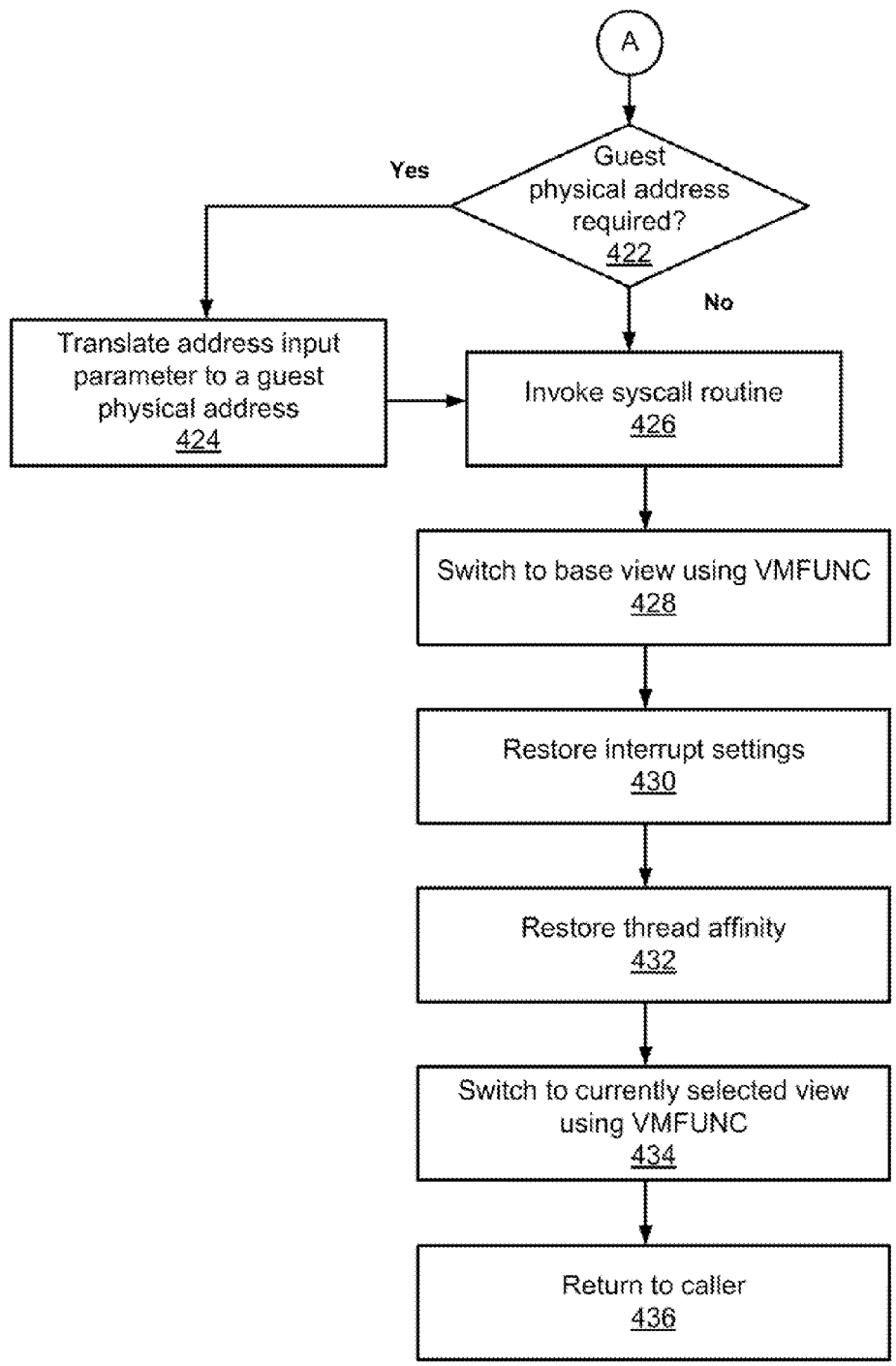

The EPT editor may be configured to accept commands from other code in the kernel and from userspace applications. Commands from either of these origins may use a Syscall-style interface to communicate the commands to the EPT editor. Syscall interfaces are typically used by operating systems to allow a less privileged ring, for example ring 3, to communicate with a more privileged ring, for example ring 0. Embodiments of the present disclosure, however, use Syscall to transition into the EPT editor view from other views. The transition is implemented in a function that receives a command data structure as input. The function is contained within a "trampoline" region of the editor view, which may be executed from other views and therefore provides a mechanism to "bounce" in and out of the EPT editor view. The data structure specifies the Syscall to be invoked along with its parameters. It also includes space for the outputs from the Syscall, so that the invoking view may access these outputs. The Syscall function may be configured to perform the following operations, consistent with an embodiment as illustrated in FIG. 4.

At operation 402, the Syscall is initiated. At operations 404, 406 a switch to the base view is performed, unless the VMFUNC instruction is not yet enabled. At operation 408, a data structure is initialized on the stack with information that may be needed by a Syscall routine but which is relatively expensive to obtain on demand. This may include the identifier of the hardware thread performing the Syscall and the current driver thread identifier.

At operation 410, the affinity of the current driver thread is set to improve the probability of it remaining in the hardware thread identified in the previous operation. At operation 412, the IRQ level of the driver thread may optionally be raised to the maximum value and the hardware thread's interrupt flag cleared to reduce the number of interrupts being delivered. This may improve performance by avoiding spurious EPT violations that would otherwise occur when the processor attempts to execute the interrupt handler while in the EPT editor view.

At operation 414, a check is performed to determine which specific routine is to be invoked and to prepare for that invocation. If the initialization routine is selected, operation 416, then a VM call is performed at operation 418 to request that the VMFUNC instruction be enabled. At operation 420, prior to invoking any of the Syscall operations, the VMFUNC instruction is used to switch to the EPT editor view.

For Syscall operations that require a guest physical address as a parameter, as determined at operation 422, a transformation to obtain the desired address is optionally performed at operation 424. If the address is specified as a guest virtual address relative to the current process. Windows™ kernel routines may be used to translate the address to the corresponding guest physical address. If the address is specified as a guest virtual address relative to some other process, the address may be translated in one of the following two ways: (1) Windows™ routines may be used to attach the current driver thread to the desired process before performing the translation; or (2) Windows™ routines may be used to temporarily create a new thread in the desired process' context before performing the translation in that new thread.

At operation 426, the desired routine is invoked. After the routine returns, the following actions are performed. At operation 428, a switch is made back to the base view. At operation 430, the interrupt flag is optionally set and the IRQ level of the driver thread is lowered to re-enable interrupt deliveries that were blocked during the Syscall. At operation 432, the driver thread is reverted to its original processor affinity. At operation 434, a switch is made to the view that is currently selected for use on the current processor.

Figure 5:
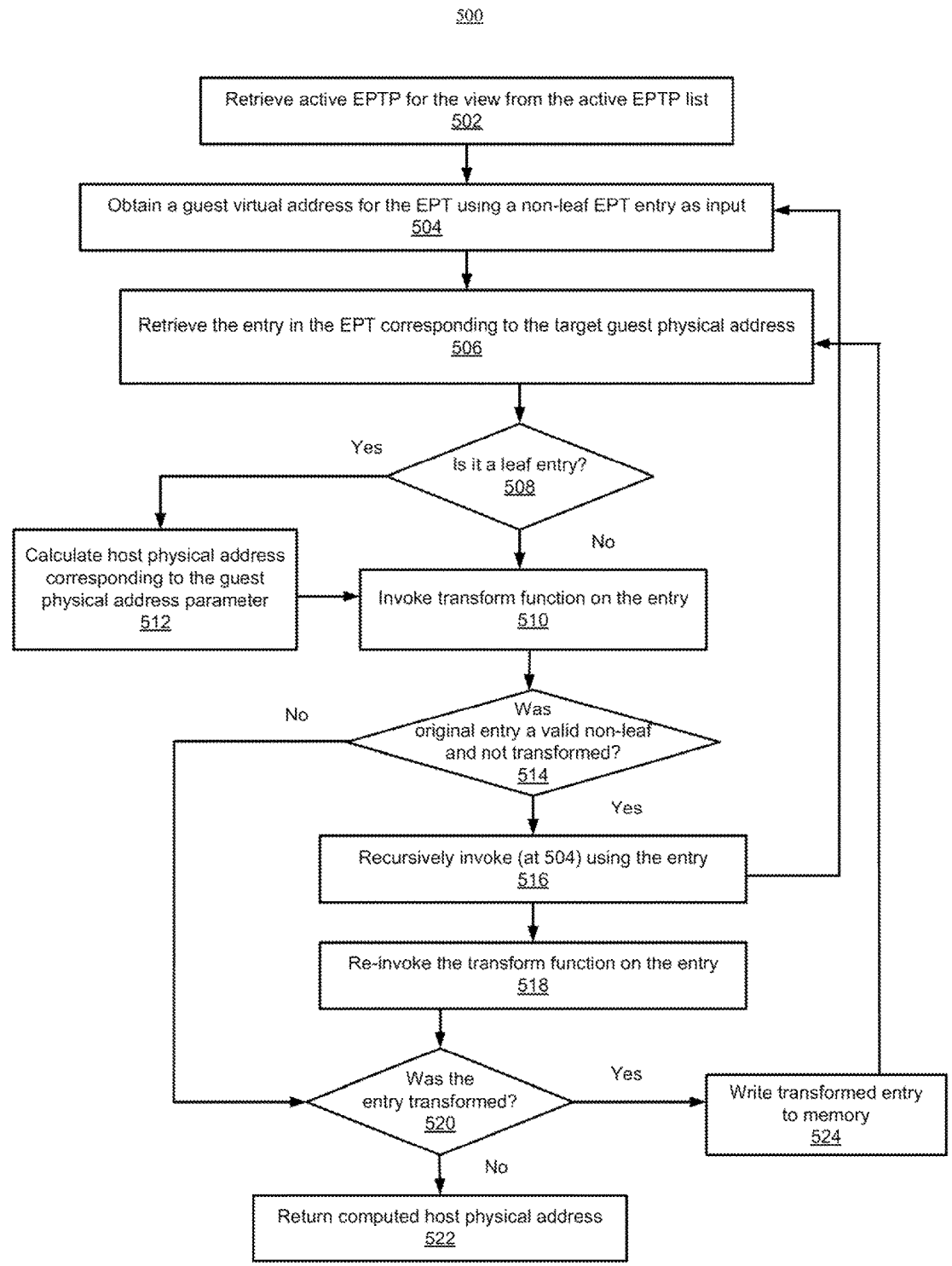
FIG. 5 illustrates a flowchart of operations of another example embodiment consistent with the present disclosure.

Many of the Syscall routines make use of an EPT walking function that performs the operations as illustrated in FIG. 5. The EPT walking function may be provided with parameters that specify a view handle, a target guest physical address, a transform function and a transform function state data structure. The EPT walking function and transform function together are modeled on an object-oriented "visitor" design pattern.

At operation 502, the active EPTP for a particular view is retrieved by reading it from the active EPTP list. A recursive function is then invoked that operates as follows, using the EPTP as the initial entry. At operation 504, a reverse mapping is performed from the host physical address for the table (as derived from the entry provided as a parameter) to a guest virtual address. At operation 506, the entry in the table corresponding to the target guest physical address is retrieved. If the entry is a leaf entry, as determined at operation 508, then at operation 512, the host physical address referenced by the entry is calculated. At operation 510, the transform function is invoked on the entry.

If the entry is a valid non-leaf entry and not yet transformed, as determined at operation 514, then at operation 516, the page walking function is recursively invoked on the entry, and, at operation 518, the transform function is re-invoked on the entry, informing the transform function that the page walking function has finished traversing the hierarchy rooted at that entry.

If the entry was transformed, in operations 516 and 518, the updated entry is written to memory at operation 524 and the preceding operations are repeated starting at operation 506 for the updated entry. Otherwise, the computed host physical address, if any, is returned at operation 522. If an address is returned, then it was computed during the current invocation of the routine if the routine processed a leaf entry, otherwise it was obtained from the return value of a recursive invocation of the routine.

As described above, the transform function may be invoked twice on a single non-leaf entry for each iteration of the loop. This provides the opportunity to transform the entry both before and after the routine has been recursively invoked. For example, as the routine traverses the page table hierarchy in a depth-first manner, it descends down the left-most branch of the tree, then the next-left-most branch, etc. The transform function is invoked for each entry that refers to another node in the tree both on the way down and on the way up. This isn't necessary for leaf nodes, however. The outer loop, from operation 524 to 506, allows the transform function to modify the nature of the entry (convert a leaf entry to an inner entry, etc.) and then re-run that portion of the routine on the modified entry.

The system may be configured to provide the following example Syscall routines. Some of these routines involve deallocating EPTs, and may therefore not be used on EPTs that were allocated by VMX root unless VMX root has ceded control of them to the EPT editor. The EPT modifications performed by these routines may be restricted to avoid violating security requirements of the VMM, the EPT editor, and potentially other system components. For example, a view invoking a Syscall should not be allowed to grant itself write access to EPTs.

(1) Initialize or de-initialize the EPT editor.
(2) Convert a guest physical address to a host physical address. This may be accomplished through the page walking function without the need to specify a transform function.
(3) Delete a view.
(4) Create an empty view.
(5) Insert or update a mapping in a view at a specified level in the EPT hierarchy. Additionally, updates to the attributes of the affected EPT entry and its ancestors may be provided according to specifications supplied as parameters. This routine may be configured to fragment and coalesce entries as described below:

(a) When an insertion is specified that falls within a region already mapped by an entry and maps a smaller portion of that region (e.g., is at a deeper level in the EPT hierarchy), then the parent entry/entries is/are fragmented so that the new mapping takes effect only on the specified region.

(b) When an insertion is specified that maps a region containing regions already mapped within the hierarchy, those existing entries are deleted prior to the new entry being inserted (e.g., the entries are coalesced).

(6) Perform the actions of the preceding Syscall routine, but calculate the appropriate level for the mapping to ensure that a memory region specified using a (base address, size) pair is completely covered by the updated mapping.

(7) Delete a mapping at a specified level. As explained in connection with Syscall routine 5 above, this routine may also fragment and coalesce entries as required to minimize the number of entries needed to express a given policy. The parameters to this routine may be a subset of the parameters for Syscall routine 5.

(8) Update the permissions along a branch of the EPT hierarchy selected by the guest physical address parameter. This routine may not fragment or coalesce entries, unlike Syscall routine 5 above, but its parameters may be a subset of the parameters of Syscall routine 5.

(9) Invalidate all leaf entries involved in mapping a specified memory region, and also delete tables that become empty during that process. This routine does not fragment or coalesce entries, unlike Syscall routine 7, above.

(10) Update the permissions for all entries (leaf and non-leaf) involved in translating the addresses within a specified memory region. This routine does not fragment or coalesce entries, unlike Syscall routine 5. Another distinction from Syscall routine 5 is that this routine is optimized to move laterally through adjacent EPT entries that need to be updated, to avoid the overhead of returning to the EPTP prior to updating each entry.

(11) Switch to a new active view on the current processor. This is the view that will be selected whenever the EPT editor view completes a Syscall.

(12) Invalidate a specific view to ensure that any modifications that were performed take effect, even if previous mappings are still cached.

In some embodiments, a mutex or other suitable locking mechanism may be used to ensure that only one driver thread is allowed to edit each view at any point in time.

In some embodiments, adapter functions are implemented which construct a Syscall data structure and invoke the Syscall as a simplifying convenience. The trampoline region may be used for some adapter functions that switch to the base view; invoke a specific Windows™ kernel routine; switch back to the EPT editor view; and return the result of that kernel routine. This prevents the EPT violation that would otherwise occur each time those kernel routines are invoked from the EPT editor view.

In some embodiments, functions that may typically be inserted by the compiler, or provided in a library, are re-implemented so that they may be invoked from the EPT editor view without requiring a view switch or generating an EPT violation.

In some embodiments, hash tables may be used to perform reverse mappings from host physical addresses to the corresponding guest virtual addresses with increased efficiency.

In some embodiments, an IOCTL interface is implemented to allow userspace (ring 3) applications to invoke the Syscall function. The userspace application may construct the Syscall data structure or a userspace library of Syscall adapter functions may be implemented as a simplifying convenience.

Figure 6:
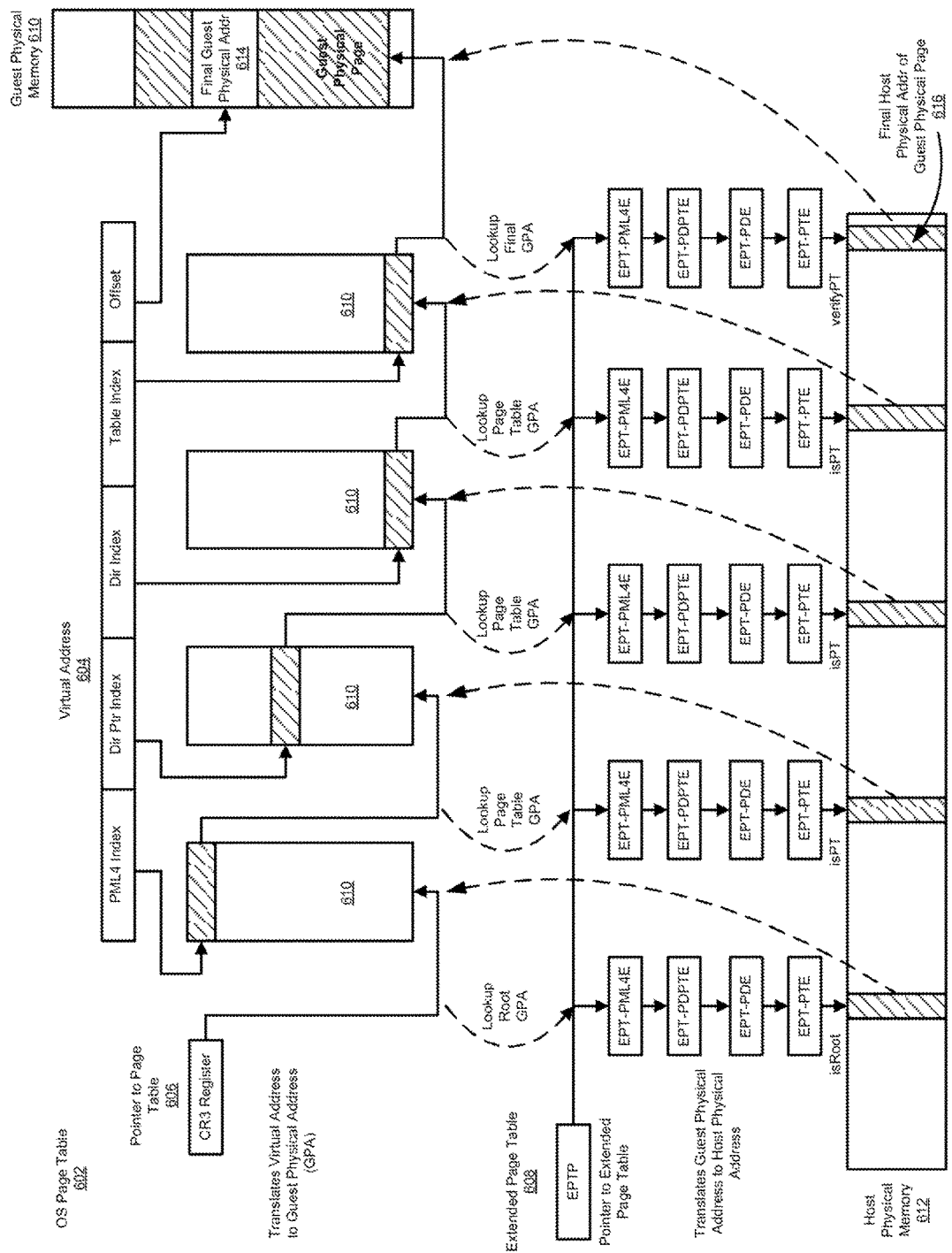
FIG. 6 illustrates a page table walk consistent with an example embodiment of the present disclosure.

FIG. 6 illustrates a page table walk consistent with an example embodiment of the present disclosure. The processor's PMH 110 is configured to interpret the page table structures and perform the page table walk. A virtual address 604 is translated to a guest physical address 614 in guest physical memory 610 using OS page tables 602. Extended page tables (EPTs) 608 are used to translate the guest physical address to a host physical address 616 in host physical memory 612. The virtual address 604 may be partitioned into a number of regions or bit fields. For example, in the case of a 4-level Intel Architecture 32 bit enhanced (IA-32e) paging mode, the fields are, from left to right: a page map level 4 (PML4) index, a directory pointer index, a directory index, a table index and an offset. The use of other paging modes, for example a 3-level Physical Address Extension (PAE) paging mode, is also possible.

The page table walk begins by obtaining a pointer 606 to the page table from the processor's CR3 register. This pointer is in the form of a guest physical address (GPA) which is translated to host physical memory through the extended page table hierarchy (paging structure) 608. The traverse of the EPT hierarchy, or tree, begins with the EPT pointer, which specifies the first paging structure for a guest, and progresses through the following layers: root layer EPT Page Map Level 4 Entry (EPT-PML4E), EPT Page Directory Pointer Table Entry (EPT-PDPTE) EPT Page Directory Entry (EPT-PDE) down to the EPT Page Table Entry (EPT-PTE) which is the leaf. A first indicator, referred to here as an "isRoot" bit, in the EPT leaf entry may be used to indicate that the associated GPA page address is a page table root (referenced by CR3). The GPA root is then used in combination with the PML4 Index from the virtual address 604 to a first page table GPA from guest physical memory 610. The process is repeated to obtain subsequent levels of page table GPAs as illustrated. During this process a second indicator, referred to here as an "isPT" bit, in the EPT leaf entries may be used to indicate that the associated GPA page address is accessible to the processor's PMH. The final or rightmost page walk loop produces a link between the final GPA 614 and the final host physical address 616. During this final loop a third indicator, referred to here as an "isVerify" bit, in the EPT leaf entry indicates that the referenced page must be referenced by a checked page table lookup as will be explained below in connection with FIG. 7.

The presence of any of the isRoot, IsPT, or isVerify set bits in an EPT entry permits the PMH to access the referenced page of memory both for reads and for writes and to update the "accessed" and "dirty" bits, regardless of the settings of the main EPT entry permission bits. The "accessed" bit in a PTE is employed to indicate that the processor used the PTE as part of a guest virtual to guest physical address translation. The "dirty" bit in a PTE is employed to indicate that a write to a guest physical address occurred, where that PTE was walked by the PMH as part of the process for computing the guest physical address.

Use of the isRoot bit enables the avoidance of the relatively more expensive VM exit that would otherwise be required, to ensure that only approved OS page tables are used, whenever a guest changes the value of the CR3 register. Although the processor may provide a feature known as a "CR3 target list" that can be used to pre-approve up to four CR3s, in practice, many more than four CR3s are typically used. The isRoot bit thus provides the capability equivalent of an unlimited CR3 target list. Since the EPT editor operates in ring 0, its memory accesses are translated and regulated using OS page tables and thus the security of the EPT editor depends on the protection of those translations.

Figure 7:
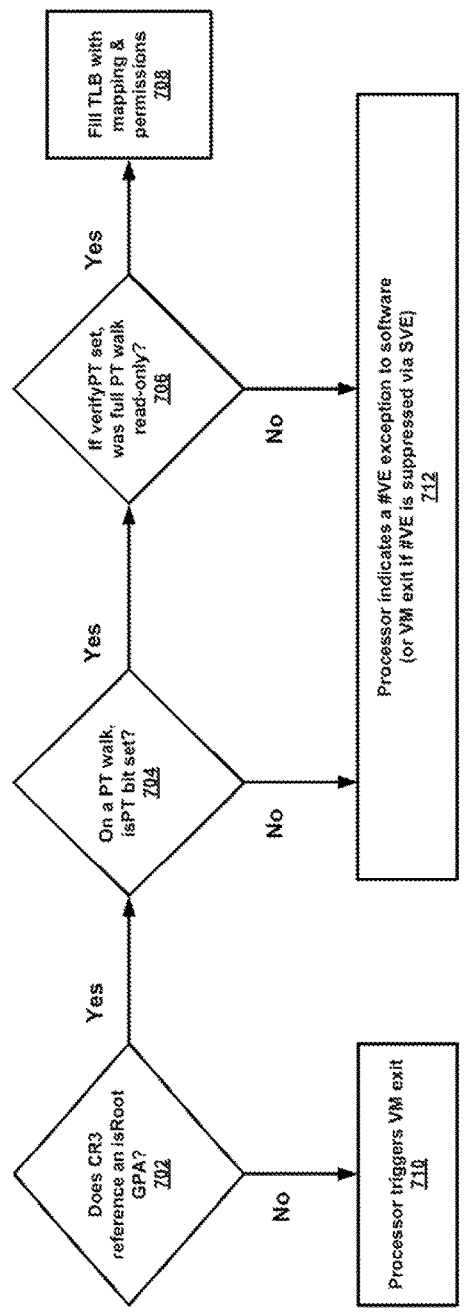
FIG. 7 illustrates a flowchart of operations of another example embodiment consistent with the present disclosure.

FIG. 7 illustrates a flowchart of operations 700 of an example embodiment consistent with the present disclosure. The processor's PMH may be configured to perform the checks indicated at operations 702, 704 and 706 as it walks through the page tables and corresponding EPTs. At operation 702, if the CR3 register does not reference an isRoot GPA then, at operation 710, the processor may trigger a VM exit to VMX root mode where the VMM may check mappings and set appropriate isRoot/isPT bits and other permission bits for the OS page tables.

At operation 704, if the isPT bit is found not to be set on a PT walk then a virtualization exception (#VE) or VM exit is generated at operation 712. Similarly, at operation 706, if the verifyPT bit is set and the full PT walk was not read-only, a virtualization exception (#VE) or VM exit is generated at operation 712. Otherwise, the Translation Look-aside Buffer (TLB) which is configured to cache page table mappings for virtual to physical address translations, is filled with the resulting mapping and permissions.

Figure 8:
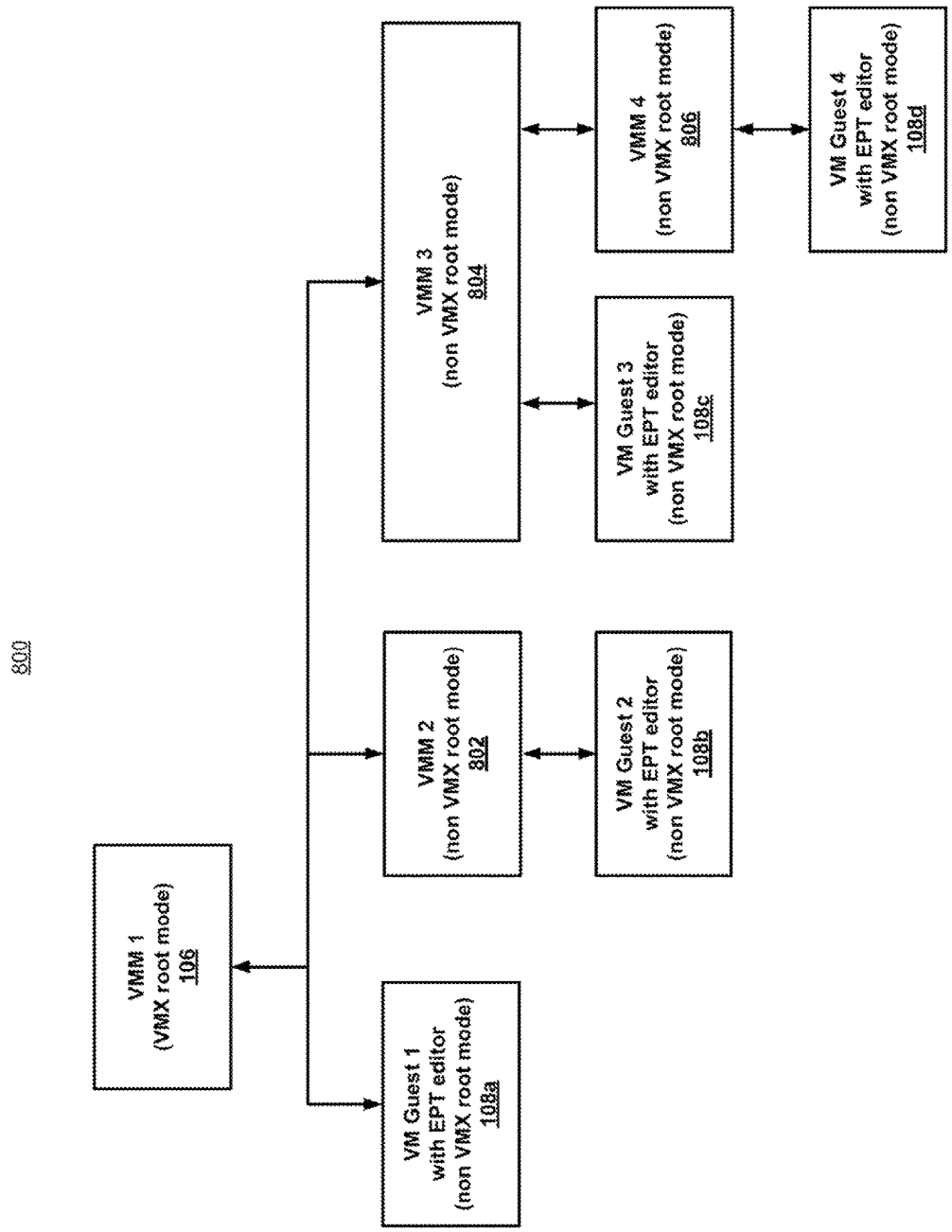
FIG. 8 illustrates a block diagram of another example embodiment consistent with the present disclosure.

FIG. 8 illustrates a block diagram 800 of another example embodiment consistent with the present disclosure. In this embodiment, VMMs may be nested, for example VMM 2 802, VMM 3 804 and VMM 4 806 are shown as guests of VMM 1 106. VMM 1 is therefore responsible for enforcing the necessary protections in this layered model (i.e., VMM1 is the lowest layer and VMM 4 is the highest layer). In this embodiment. VMM 1 runs in VMX root mode while all other VMMs and guests run in ring 0 or higher (less privileged) modes.

VMMs 2-4 may, however, require access to VMX root processor functionality, so VMM 1 may be configured to emulate those operations including access to EPTs. Only the EPTs in VMM 1 are used by the processor's PMH 110. The EPT editor accesses EPTs from a "logical" ring 0, that is, the ring that would have been employed if nested virtualization were not in use. The actual (or physical) ring that is used to implement each mode in nested virtualization may be different from the logical ring. For example, logical VMX root mode for VMMs 2-4 may actually be implemented using physical ring 0, while logical VMX root mode for VMM 1 may actually be implemented using physical VMX root mode. In some applications, lower VMM layers (e.g., VMM 1) may be interested in distinguishing between EPT edits from higher VMM layers (e.g., VMMs 2-4) and EPT edits from Guest layers, so they may need to map accesses from a single physical ring to different logical rings.

In some nested virtualization embodiments, lower VMMs trap and emulate VM exits and VM calls generated by guests of higher VMMs, and attempts by higher layers to edit the VM control data structures (VMCS) which manage transitions into and out of VMX root mode and other virtualization-related states (i.e., VMCS shadowing). The inline EPT editor in guests 2-4 reduces the overhead of this mechanism by performing EPT edits in ring 0 that would otherwise have been performed by VMMs 2-4. A transition to VMM 2-4 for this purpose would actually be implemented by causing VMM 1 to receive a trap or call from the guest, setup an emulated VMCS for the appropriate higher layer VMM, invoke the higher VMM, process any VMCS accesses from that higher VMM, and then transfer control back to the guest that generated the event. These extra operations can be avoided if the inline EPT editor is used to perform the EPT edit.

VMMs 1 and 3 may also be configured to process the isPT, isRoot, and verifyPT bits in the EPTs, as described previously, which may be set by VMMs 2-4 or by the EPT editor in any of the guests. VMMs 1 and 3 may accomplish this by propagating those bits through to its own EPTs that correspond to EPTs in VMMs 2-4.

Additionally, in some embodiments, access to the EPT editor's stack may be controlled to maintain security since the editor's control flow and operations are affected by the storing of return addresses and local variables through the stack. This control may include the following. Dedicating a separate stack to the EPT editor associated with each hardware (HW) thread. Setting the stack segment (SS) register and stack pointer registers (ESP/RSP) to known-good values after transitioning into the EPT editor view, and using EPTs to ensure that the dedicated stack regions can only be accessed by the EPT editor view on the appropriate HW thread.

Figure 9:
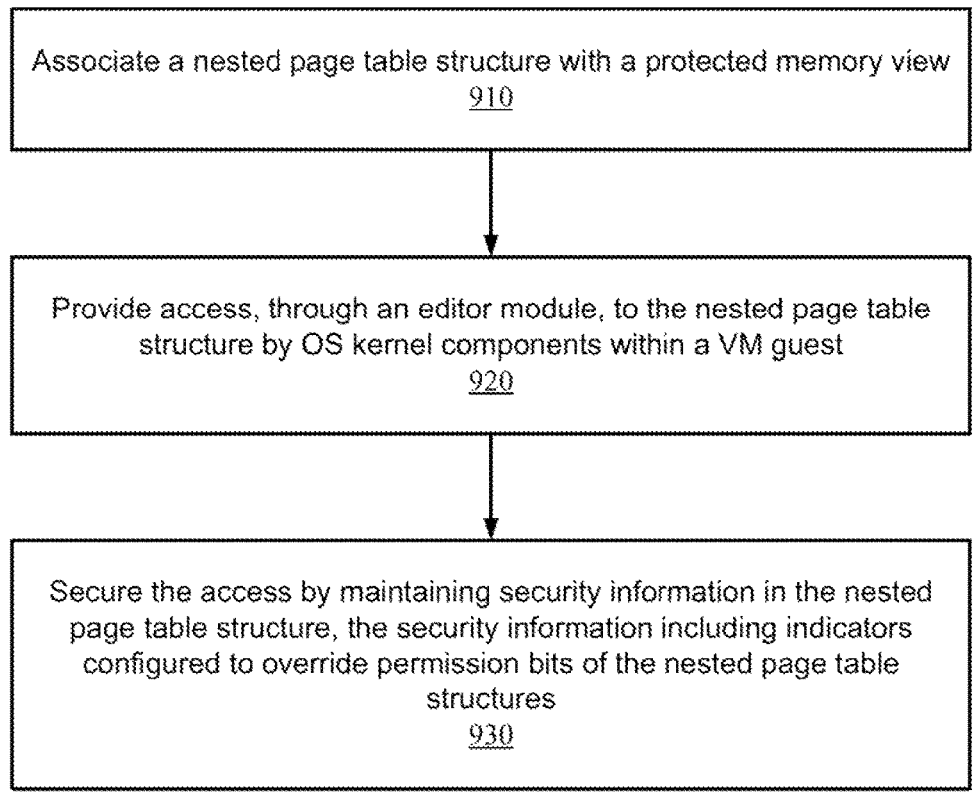
FIG. 9 illustrates a flowchart of operations of another example embodiment consistent with the present disclosure.

FIG. 9 illustrates a flowchart of operations 900 of another example embodiment consistent with the present disclosure. The operations provide a method for protected memory views in a VM environment. At operation 910, a nested page table structure is associated with one of the protected memory views. At operation 920, access is provided, through an editor module, to the nested page table structure by OS kernel components within a guest of the VM. At operation 930, the access is secured by maintaining security information in the nested page table structure. The security information includes a first indicator configured to override permission bits of the nested page table structure and to indicate that a GPA page address associated with the nested page table structure is a root level paging structure, the root level paging structure permitted to be processed by a page handling processor. The security information also includes a second indicator configured to override permission bits of the nested page table structure and to indicate that the GPA page address is a non-root level paging structure, the non-root level paging structure permitted to be processed by the page handling processor. The security information further includes a third indicator configured to override permission bits of the nested page table structure and to indicate that the GPA page address is a read-only mode paging structure, wherein additional paging structures accessed during a page walk based on the read-only mode paging structure are also configured in a read-only mode.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, methods and computer readable media for a protected memory view enabling EPT access by trusted guest software executing in ring 0, outside of VMX root mode. The following examples pertain to further embodiments.

The system may include an editor module configured to provide access to a nested page table structure by OS kernel components within a guest of the VM, and the nested page table structure is associated with one of the protected memory views. The system of this example may also include a page handling processor configured to secure the access by maintaining security information in the nested page table structure. The security information may include: a first indicator configured to override permission bits of the nested page table structure and to indicate that a GPA page address associated with the nested page table structure is a root level paging structure, the root level paging structure permitted to be processed by the page handling processor; a second indicator configured to override permission bits of the nested page table structure and to indicate that the GPA page address is a non-root level paging structure, the non-root level paging structure permitted to be processed by the page handling processor; and a third indicator configured to override permission bits of the nested page table structure and to indicate that the GPA page address is a read-only mode paging structure, and additional paging structures accessed during a page walk based on the read-only mode paging structure are also configured in a read-only mode.

Another example system includes the forgoing components and the editor module is further configured to execute in a ring 0 privilege mode, and the ring 0 privilege mode is a reduced privilege mode relative to a privilege mode associated with a VMM.

Another example system includes the forgoing components and the editor module is further configured to provide access to the nested page table structure by user space applications within the guest of the VM, the user space applications configured to execute in a ring 3 privilege mode, and the ring 3 privilege mode is a reduced privilege mode relative to the ring 0 privilege mode.

Another example system includes the forgoing components and the editor module is further configured to provide an invocation mechanism for the editor module, the invocation mechanism based on execution of a VMFUNC instruction.

Another example system includes the forgoing components and the editor module is further configured to provide a Syscall interface configured to expose the editor module to the OS kernel components.

Another example system includes the forgoing components and the editor module is further configured to provide an IOCTL interface configured to expose the editor module to the user space applications.

Another example system includes the forgoing components and the editor module is further configured to set access permissions associated with the protected memory views at a selected level within the nested page table structure.

Another example system includes the forgoing components and the protected memory views are configured to monitor and detect unauthorized access to memory, the unauthorized access associated with malware.

Another example system includes the forgoing components and the protected memory views includes memory mapped IO regions, and the protected memory views are configured to prevent unauthorized access to devices associated with the memory mapped IO regions.

According to another aspect there is provided a method. The method may include associating a nested page table structure with one of the protected memory views. The method of this example may also include providing access, through an editor module, to the nested page table structure by OS kernel components within a guest of the VM. The method of this example may further include securing the access by maintaining security information in the nested page table structure. The security information may include: a first indicator configured to override permission bits of the nested page table structure and to indicate that a GPA page address associated with the nested page table structure is a root level paging structure, the root level paging structure permitted to be processed by a page handling processor; a second indicator configured to override permission bits of the nested page table structure and to indicate that the GPA page address is a non-root level paging structure, the non-root level paging structure permitted to be processed by the page handling processor; and a third indicator configured to override permission bits of the nested page table structure and to indicate that the GPA page address is a read-only mode paging structure, and additional paging structures accessed during a page walk based on the read-only mode paging structure are also configured in a read-only mode.

Another example method includes the forgoing operations and further includes executing the editor module in a ring 0 privilege mode, and the ring 0 privilege mode is a reduced privilege mode relative to a privilege mode associated with a VMM. Another example method includes the forgoing operations and further includes providing access to the nested page table structure by user space applications within the guest of the VM, the user space applications configured to execute in a ring 3 privilege mode, and the ring 3 privilege mode is a reduced privilege mode relative to the ring 0 privilege mode.

Another example method includes the forgoing operations and further includes invoking the editor module through execution of a VMFUNC instruction.

Another example method includes the forgoing operations and further includes exposing the editor module to the OS kernel components through a Syscall interface.

Another example method includes the forgoing operations and further includes exposing the editor module to the user space applications through an IOCTL interface.

Another example method includes the forgoing operations and further includes setting access permissions associated with the protected memory views at a selected level within the nested page table structure.

Another example method includes the forgoing operations and further includes monitoring and detecting, through the protected memory views, unauthorized access to memory, the unauthorized access associated with malware.

Another example method includes the forgoing operations and further including memory mapped IO regions in the protected memory views and preventing unauthorized access to devices associated with the memory mapped IO regions.

According to another aspect there is provided a system. The system may include a means for associating a nested page table structure with one of the protected memory views. The system of this example may also include a means for providing access, through an editor module, to the nested page table structure by OS kernel components within a guest of the VM. The system of this example may further include a means for securing the access by maintaining security information in the nested page table structure. The security information may include: a first indicator configured to override permission bits of the nested page table structure and to indicate that a GPA page address associated with the nested page table structure is a root level paging structure, the root level paging structure permitted to be processed by the page handling processor a second indicator configured to override permission bits of the nested page table structure and to indicate that the GPA page address is a non-root level paging structure, the non-root level paging structure permitted to be processed by the page handling processor; and a third indicator configured to override permission bits of the nested page table structure and to indicate that the GPA page address is a read-only mode paging structure, and additional paging structures accessed during a page walk based on the read-only mode paging structure are also configured in a read-only mode.

Another example system includes the forgoing components and further includes a means for executing the editor module in a ring 0 privilege mode, and the ring 0 privilege mode is a reduced privilege mode relative to a privilege mode associated with a VMM.

Another example system includes the forgoing components and further includes a means for accessing the nested page table structure by user space applications within the guest of the VM, the user space applications configured to execute in a ring 3 privilege mode, and the ring 3 privilege mode is a reduced privilege mode relative to the ring 0 privilege mode.

Another example system includes the forgoing components and further includes a means for invoking the editor module through execution of a VMFUNC instruction.

Another example system includes the forgoing components and further includes a means for exposing the editor module to the OS kernel components through a Syscall interface.

Another example system includes the forgoing components and further includes a means for exposing the editor module to the user space applications through an IOCTL interface.

Another example system includes the forgoing components and further includes a means for setting access permissions associated with the protected memory views at a selected level within the nested page table structure.

Another example system includes the forgoing components and further includes a means for monitoring and detecting, through the protected memory views, unauthorized access to memory, the unauthorized access associated with malware.

Another example system includes the forgoing components and further includes a means for including memory mapped IO regions in the protected memory views and for preventing unauthorized access to devices associated with the memory mapped IO regions.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system to provide protected memory views in a virtual machine (VM) environment, said system comprising:
    editor circuitry configured to provide access to an extended page table structure by operating system (OS) kernel components within a guest of said VM, wherein said extended page table structure is associated with one of said protected memory views; and
    a page handling processor comprising a CR3 register, the page handling processor configured to secure said access by maintaining security information in said extended page table structure, said security information comprising:
    a first indicator bit in an extended page table leaf entry in said extended page table configured to cause said page handling processor to override permission bits of said extended page table structure and to indicate that a guest physical address (GPA) page address associated with said extended page table structure is a root level paging structure referenced by the CR3 register, wherein said root level paging structure is permitted to be processed by said page handling processor;
    a second indicator bit in an extended page table leaf entry in said extended page table configured to cause said page handling processor to override permission bits of said extended page table structure and to indicate that said GPA page address is a non-root level paging structure, said non-root level paging structure permitted to be processed by said page handling processor; and
    a third indicator bit in an extended page table leaf entry in said extended page table configured to cause said page handling processor to override permission bits of extended page table structure and to indicate that said GPA page address is a read-only mode paging structure, wherein additional paging structures accessed during a page walk based on said read-only mode paging structure are also configured in a read-only mode,
wherein:
the first and second indicator bits are different from one another;
when any of the first, second, or third indicator bits is set, said page handling processor is configured to update at least one of an accessed indicator in said extended page table leaf entry to indicate that said page handing processor used said extended page table leaf entry in address translation or a dirty bit in said extended page table leaf entry to indicate that a write to said GPA page address has occurred; and
said page handling processor is configured to check settings for said first indicator bit, second indicator bit, and third indicator bit when walking said extended page table;
when, during said walk, the first indicator bit is set, the page handling processor determines that said guest physical address (GPA) page address associated with said extended page table structure is a root level paging structure, and is configured to indicate that a value of the CR3 register has changed without triggering a VM exit to VM root mode; and
when, during said walk, the second indicator bit is not set, the page handling processor determines that said GPA page address is not associated with a root level paging structure, and triggers a VM Exit to VM root mode to cause a virtual machine monitor (VMM) to cause a hypervisor to at least check mappings of said GPA page address and settings of the first, second and third indicator bits.

2. The system of claim 1, wherein said editor circuitry is further configured to execute in a ring 0 privilege mode, wherein said ring 0 privilege mode is a reduced privilege mode relative to a privilege mode associated with a virtual machine monitor (VMM).

3. The system of claim 2, wherein said editor circuitry is further configured to provide access to said extended page table structure by user space applications within said guest of said VM, said user space applications configured to execute in a ring 3 privilege mode, wherein said ring 3 privilege mode is a reduced privilege mode relative to said ring 0 privilege mode.

4. The system of claim 1, wherein said editor circuitry is further configured to provide an invocation mechanism for said editor circuitry, said invocation mechanism based on execution of a Virtual Memory Function (VMFUNC) instruction.

5. The system of claim 1, wherein said editor circuitry is further configured to provide a system call (Syscall) interface configured to expose said editor circuitry to said OS kernel components.

6. The system of claim 1, wherein said editor circuitry is further configured to provide an input/output control (IOCTL) interface configured to expose said editor circuitry to said user space applications.

7. The system of claim 1, wherein said editor circuitry is further configured to set access permissions associated with said protected memory views at a selected level within said extended page table structure.

8. The system of claim 1, wherein said protected memory views are configured to monitor and detect unauthorized access to memory, said unauthorized access associated with malware.

9. The system of claim 1, wherein said protected memory views includes memory mapped IO regions, and said protected memory views are configured to prevent unauthorized access to devices associated with said memory mapped IO regions.

10. The system of claim 1, wherein said system is a smart phone, a laptop computing device, a smart TV or a smart tablet.

11. The system of claim 10, further comprising a user interface, wherein said user interface is a touch screen.

12. A method to provide protected memory views in a virtual machine (VM) environment, said method comprising:
associating an extended page table structure with one of said protected memory views;
providing access, through editor circuitry, to said extended page table structure by operating system (OS) kernel components within a guest of said VM; and
securing said access by maintaining security information in said extended page table structure, said security information comprising:
a first indicator bit in an extended page table leaf entry in said extended page table configured to override permission bits of said extended page table structure and to indicate that a guest physical address (GPA) page address associated with said extended page table structure is a root level paging structure referenced by a CR3 register of a page handling processor, said root level paging structure permitted to be processed by said page handling processor;
a second indicator bit in an extended page table leaf entry in said extended page table configured to override permission bits of said extended page table structure and to indicate that said GPA page address is a non-root level paging structure, said non-root level paging structure permitted to be processed by said page handling processor; and
a third indicator bit in an extended page table leaf entry in said extended page table configured to override permission bits of said extended page table structure and to indicate that said GPA page address is a read-only mode paging structure, wherein additional paging structures accessed during a page walk based on said read-only mode paging structure are also configured in a read-only mode;
wherein:
the first and second indicator bits are different from one another;
when any of the first, second, or third indicator bits is set, said page handling processor is configured to update at least one of an accessed indicator in said extended page table leaf entry to indicate that said page handing processor used said extended page table leaf entry in address translation or a dirty bit in said extended page table leaf entry to indicate that a write to said GPA page address has occurred;
said page handling processor is to check settings for said first indicator bit, said second indicatory and said third indicator bit when walking said extended page table;
when, during said walk, the first indicator bit it set, the page handling processor determines that said guest physical address (GPA) page address associated with said extended page table structure is a root level paging structure, and is configured to indicate that a value of the CR3 register has changed without triggering a VM exit to VM root mode; and
when, during said walk, the second indicator bit is not set, the page handling processor determines that said GPA page address is not associated with a root level paging structure, and triggers a VM Exit to VM root mode to cause a hypervisor to at least check mappings of said GPA page address and settings of the first, second and third indicator bits.

13. The method of claim 12, further comprising executing said editor circuitry in a ring 0 privilege mode, wherein said ring 0 privilege mode is a reduced privilege mode relative to a privilege mode associated with a virtual machine monitor (VMM).

14. The method of claim 13, further comprising providing access to said extended page table structure by user space applications within said guest of said VM, said user space applications configured to execute in a ring 3 privilege mode, wherein said ring 3 privilege mode is a reduced privilege mode relative to said ring 0 privilege mode.

15. The method of claim 12, further comprising setting access permissions associated with said protected memory views at a selected level within said extended page table structure.

16. The method of claim 12, further comprising monitoring and detecting, through said protected memory views, unauthorized access to memory, said unauthorized access associated with malware.

17. The method of claim 12, further comprising including memory mapped IO regions in said protected memory views and preventing unauthorized access to devices associated with said memory mapped IO regions.

18. A non-transitory computer-readable storage medium having instructions stored thereon which when executed by a processor result in the following operations for providing protected memory views in a virtual machine (VM) environment, said operations comprising:
  associating an extended page table structure with one of said protected memory views;
  providing access, through editor circuitry, to said extended page table structure by operating system (OS) kernel components within a guest of said VM; and
  securing said access by maintaining security information in said extended page table structure, said security information comprising:
  a first indicator bit in an extended page table leaf entry in said extended page table configured to override permission bits of said extended page table structure and to indicate that a guest physical address (GPA) page address associated with said extended page table structure is a root level paging structure referenced by a CR3 register of a page handling processor, said root level paging structure permitted to be processed by said page handling processor;
  a second indicator, bit in an extended page table leaf entry in said extended page table configured to override permission bits of said extended page table structure and to indicate that said GPA page address is a non-root level paging structure, said non-root level paging structure permitted to be processed by said page handling processor; and
  a third indicator bit in an extended page table leaf entry in said extended page table configured to override permission bits of said extended page table structure and to indicate that said GPA page address is a read-only mode paging structure, wherein additional paging structures accessed during a page walk based on said read-only mode paging structure are also configured in a read-only mode;
  wherein:
  the first and second indicator bits are different from one another;
  when any of the first, second, or third indicator bits is set, said page handling processor is configured to update at least one of an accessed indicator in said extended page table leaf entry to indicate that said page handing processor used said extended page table leaf entry in address translation or a dirty bit in said extended page table leaf entry to indicate that a write to said GPA page address has occurred;
  said page handling processor is to check settings for said first indicator bit, second indicator bit, and third indicator bit when walking said extended page table;
  when, during said walk, the first indicator bit it set, the page handling processor determines that said guest physical address (GPA) page address associated with said extended page table structure is a root level paging structure, and is configured to indicate that a value of the CR3 register has changed without triggering a VM exit to VM root mode; and
  when, during said walk, the second indicator bit is not set, the page handling processor determines that said GPA page address is not associated with a root level paging structure, and triggers a VM Exit to VM root mode to cause a hypervisor to at least check mappings of said GPA page address and settings of the first, second and third indicator bits.

19. The computer-readable storage medium of claim 18, further comprising the operation of executing said editor circuitry in a ring 0 privilege mode, wherein said ring 0 privilege mode is a reduced privilege mode relative to a privilege mode associated with a virtual machine monitor (VMM).

20. The computer-readable storage medium of claim 19, further comprising the operation of providing access to said extended page table structure by user space applications within said guest of said VM, said user space applications configured to execute in a ring 3 privilege mode, wherein said ring 3 privilege mode is a reduced privilege mode relative to said ring 0 privilege mode.

21. The computer-readable storage medium of claim 18, further comprising the operation of invoking said editor circuitry through execution of a Virtual Memory Function (VMFUNC) instruction.

22. The computer-readable storage medium of claim 18, further comprising exposing said editor circuitry to said OS kernel components through a system call (Syscall) interface.

23. The computer-readable storage medium of claim 18, further comprising the operation of exposing said editor circuitry to said user space applications through an input/output control (IOCTL) interface.

24. The computer-readable storage medium of claim 18, further comprising the operation of setting access permissions associated with said protected memory views at a selected level within said extended page table structure.

25. The computer-readable storage medium of claim 18, further comprising the operations of monitoring and detecting, through said protected memory views, unauthorized access to memory, said unauthorized access associated with malware.

26. The computer-readable storage medium of claim 18, further comprising the operations of including memory mapped IO regions in said protected memory views and preventing unauthorized access to devices associated with said memory mapped IO regions.

* * * * *